2,769,018
Patented Oct. 30, 1956

2,769,018

CATALYTIC OXIDATION OF POLYNUCLEAR HYDROCARBONS

Herbert J. West, White Plains, N. Y., assignor to American Cyanamid Company, New York, N. Y., a corporation of Maine No Drawing. Application May 5, 1954,
Serial No. 427,883

8 Claims. (Cl. 260—385)

This invention relates to the vapor phase air oxidation of anthrocene to anthraquinone and is more particularly concerned with the vapor phase catalytic oxidation of anthracene to anthraquinone by the fluidized catalytic technique.

Hitherto, anthraquinone has been produced by the vapor phase catalytic oxidation of anthracene but such processes have consistently utilized fixed bed catalytic techniques employing very low concentrations of anthracene in air. Such techniques and low concentrations have been found essential to avoid either over-oxidation resulting in a low yield of anthroquinone, or, if the temperature is reduced to avoid over-oxidation, unchanged anthracene and excessive quantities of impurity in the crude anthraquinone obtained. An additional reason for such low concentrations is the possibility of spontaneous ignition and the threat of fire and explosion conditions involved in such a process.

The catalytic material in such a process has normally been employed in stationary beds containing relatively large grains of catalyst of up to 4–6 mm. diameter and concentration of anthracene in the anthracene-air feed mixture past such beds has customarily been maintained on the order of only about 20–22 grams of anthracene per cubic meter of air or only about 0.27–0.28 mole percent by volume. Efforts to raise the productive capacity of an installation by increasing this anthracene concentration as little as up to values of 28–30 grams of anthracene per cubic meter of air have been attempted but have not been successfully maintained without a serious loss in the yield of anthraquinone because of development of an excessively high temperature within the converter. Further increases in the anthracene concentration have even created dangerous fire and explosion hazards.

The high temperature resulting from such feed concentrations is, of course, due primarily to the exothermic nature of the reaction involved. If it is allowed to prevail, much of the anthraquinone produced will be further oxidized to phthalic anhydride and perhaps even to carbon dioxide. Efforts have been made to control the reaction temperature within a favorable range by the use of the conventional converter cooling baths, but, if a high concentration of anthracene is used and the peak temperature within the converter is reduced by such cooling means to prevent over-oxidation, then the average temperature within the unit will be too low and the product will contain unchanged anthracene.

As a matter of fact, even when using anthracene feed concentrations of as low as only 0.27 mole percent by volume in a fixed bed installation, elaborate precautions are required to maintain a satisfactory yield of crude anthraquinone free from excessive quantities of impurities. Such crude anthraquinone has been found to contain undesirable quantities of unreacted anthracene, phenanthraquinone, diphenic acid and carbazole which must be removed by suitable purification processes before a relatively pure anthraquinone can be made available to industry. Such additional processing was naturally undesirable as uneconomical, time-consuming and expensive but previous efforts to produce a purer reactor product, however, have not been as successful as could be desired.

It is a principal purpose of the present invention to provide improved processes for the vapor phase catalytic oxidation of anthracene to anthraquinone by the use of fluidized techniques whereby the concentration of anthracene in the air-feed mixture can be increased substantially without creating the possibility of dangerous fire and explosion conditions.

It is a further principal purpose of the present invention to provide improved processes for the vapor phase catalytic oxidation of anthracene to anthraquinone by the use of fluidized techniques whereby there is obtained a relatively pure converter product which does not contain unreacted anthracene, phenanthraquinone, or carbazole in any substantial amount.

I have discovered a class of fluidized catalysts which, when used in the process described above, accelerate the reaction rate and permit the use of concentrations hitherto considered impossible or too dangerous to use without increasing the hazards involved or the possibilities of fire and explosions. Additionally, it has been found that such a fluidized process produces exceptionally high yields of a highly pure anthraquinone converter product which may be simply washed with hot aqueous media to yield chemically pure (C. P.) anthraquinone of approximately 99% or greater purity. This product may then be used in many industrial processes without further purification. I have found that this combination of a safer process and a higher purity of anthraquinone converter product is obtained by employing specified reaction conditions and by using fluidized catalysts composed of a carrier such as a calcined gel of silica which is impregnated uniformly with an active vanadium catalyst, such as vanadium oxide, and also with an alkali metal salt such as potassium sulfate, potassium chloride, potassium carbonate, and the like, the catalyst being optionally further treated by the addition of small quantities of silver oxide, ferric oxide, zirconium oxide, molybdenum oxide or cerium oxide, or a mixture of the oxides of these metals.

In the following description, calcined silica gel will be used to illustrate the invention but such is not to be construed as limitative thereof, inasmuch as other carriers such as zeolites, celite, Alundum, pumice, activated alumina, etched quartz, etc., may be used.

The catalysts are obtained, for example, by first preparing an aqueous dispersion containing gelatinous silica, such as a silica hydrogel, at relatively high dilutions, such as at a solids content of about 3–10% of silica by weight. This is preferably accomplished by reacting an aqueous potassium silicate solution with aqueous sulfuric acid at dilutions such as to obtain the desired concentration of gelatinous silica, since by this procedure about 2% to 15% of potassium sulfate is also produced in the solution. By impregnating this dilute silica-potassium sulfate dispersion with the requisite quantities of potassium or ammonium vanadate or other suitable water-soluble vanadium compounds, together with promoters or other catalyst ingredients, if desired, and by heating the dispersion and conditioning it at an elevated temperature, there is produced a catalyst gel having a high degree of toughness and abrasion resistance. Preferably the aqueous slurry, containing all of the catalyst ingredients, is heated with continuous agitation for from about 0.5 to 2 hours at 50–85° C., after which the temperature is raised and the solids content of the slurry concentrated by evaporation to the degree that will produce a gel of the desired toughness. This is accomplished when the concentration of the dispersion is increased to a solids content within the range of from about 12–15% to about 35%.

The fluid gel is then preferably spread out in thin layers and dried, such as in a Procter-Schwartz drier, after which it may be calcined at temperatures up to 500° C. and ground to the desired particle size. Conveniently, the calcination may be carried out in the catalytic reactor itself, such as by injecting the dried and ground catalyst into the reaction tube by means of a stream of air while maintaining a temperature of about 400° C. Alternatively, if spherical catalyst particles are desired, the fluid gel having the above-described solids content of 12–35% may be sprayed into hot products of combustion having a temperature of about 600°–1200° F. (316°–649° C.) by any of the standard spray drying procedures.

In general, sufficient quantities of silicate and acid are used so as to provide from about 40 to 80% by weight of silica in the calcined catalyst, with the preferred embodiment containing approximately 40–50%. Additionally, sufficient amounts of a water-soluble vanadium salt capable of producing a vanadium oxide upon final calcination of the catalyst are employed to produce a content of about 2% to 25% by weight of $V_2O_5$ in the finished catalyst, the preferred quantity being about 2–10%. Suitable compounds are ammonium vanadate, potassium vanadate, vanadyl sulfate and the like. The optimum quantities of potassium sulfate in the catalyst compositions are from about 20% to about 60%, calculated as potassium pyrosulfate and based on the calcined weight of the catalyst, the preferred quantity being about 40–50%. The optimum amounts of silver and cerium oxide promoters or other added oxides are from about 0.05% to about 5% by weight; in catalysts containing about 10% of vanadium pentoxide, the best results are obtained with about 0.2–2% by weight of these promoters.

The method of catalyst preparation will be described in greater detail by the following specific examples. It should be understood, however, that although these examples may describe certain features of the invention, they are given primarily for purposes of illustration and the invention in its broader aspects is not limited thereto.

EXAMPLE 1

A solution of 953 parts by weight of 30° Bé. potassium silicate in 2200 parts of water was prepared and heated to 40–50° C. This solution was agitated violently while 920 parts by weight of 17% sulfuric acid of about the same temperature were added rapidly. Sufficient concentrated ammonium hydroxide (180 parts by weight of 26% $NH_4OH$) was added to adjust the pH to 8–9. The resulting gel was maintained at 65–80° C. and agitated while a solution of 57 parts by weight of $NH_4VO_3$ in 800 parts of water was added followed by the addition of a solution of 2.5 parts by weight of cerous nitrate $(Ce(NO_3)_3 \cdot 6H_2O)$ in 100 parts of water. The heating and agitation was continued at the same temperature for a total of 1 hour.

The impregnated gel was then heated to its boiling point and concentrated by boiling with agitation to about two-thirds of its original volume. It was then poured into pans and oven-dried at 110–125° C. during about 48 hours. The resulting mass was calcined at 450° C. for about 8–10 hours and ground to the following particle size distribution:

| | Percent |
|---|---|
| +100 mesh | 5–10 |
| −100 +200 mesh | 30–40 |
| −200 +325 mesh | 30–40 |
| −325 mesh | 20–25 |

The finished catalyst contained 42.6% by weight of silica, 10.2% of $V_2O_5$, 46.7% of $K_2S_2O_7$ and 0.3% of $CeO_2$.

EXAMPLE 2

The procedures set forth in Example 1 were followed substantially as set forth therein, with the exception that zirconium oxide ($ZrO_2$) was used as the promoter.

EXAMPLE 3

A solution of 953 grams of 30° Bé. potassium silicate in 66 lbs. of water was prepared and heated to 45° C. The solution was agitated strongly while 30.5 lbs. of 17% sulfuric acid was added rapidly. Sufficient concentrated ammonium hydroxide (about 2500 cc.) was then added to bring the pH to 8 to 9 and form a viscous gel that was diluted with 16.6 lbs. of water.

The temperature of the batch was raised to 75° C. and solutions of 855 grams of ammonium metavanadate in 26.4 lbs. of boiling water and 124 grams of silver nitrate in 500 cc. of water were added, bringing the total volume to about 19 gallons, and the batch was maintained at this temperature for 45 minutes. Water was then evaporated by boiling until the volume was 10 gallons, after which the gel was transferred to trays and dried at 110° C. for 48 hours. The catalyst was finally ignited for 8–10 hours at 450° C., ground and sized to the particle size distribution described in Example 1. The calcined catalyst containing 43.2% by weight of silica, 9.1% $V_2O_5$, 46.3% of $K_2S_2O_7$ and 1.4% of $Ag_2O$.

EXAMPLE 4

A solution of 953 grams of 30° Bé. potassium silicate was dissolved in 2200 cc. of water and 57 grams of powdered ammonium metavanadate were added to the silicate solution. The solution was then heated to 40–50° C., agitated, and 920 grams of 17% sulfuric acid added rapidly. The pH was adjusted to 8 to 9 with concentrated ammonium hydroxide. The resulting gel was maintained at 65–80° C. and a solution of 2½ grams of copper nitrate in 100 cc. of water was added. The gel was then heated to the boiling point and concentrated with agitation to about ⅔ of its original volume. It was then poured into pans and dried at 110–125° C. The resulting mass was calcined at 450° C. for about 8–10 hours and ground to the appropriate particle size distribution. The resulting catalyst had good activity and good abrasion resistance when tested in a fluidized bed at 370° C.

EXAMPLE 5

A solution of 630 grams of 30° Bé. potassium silicate solution in 1800 cc. of water was prepared and 45 grams of powdered potassium metavanadate were added with agitation at room temperature. When the solution was complete, the agitation was continued while 680 grams of 17% sulfuric acid were added rapidly. The pH was then adjusted to a value between 8 and 9 by adding ammonium hydroxide.

The resulting gel was heated with agitation for 10 minutes at 65–90° C. and was then boiled at atmospheric pressure for about 1 hour, or until its solids content was increased to 25–30%. It was then oven dried in thin layers at 110–125° C. and ground to approximately the particle size distribution shown in Example 1. The ground gel was blown into a reactor and heated to temperatures of 300–450° C. by means of strip heaters while a current of air sufficient to keep it in fluidized condition was introduced. This calcination was continued for about 6–8 hours, or until all of the ammonium vanadate was converted to $V_2O_5$.

EXAMPLE 6

The fluidized catalyst prepared by any of the preceding examples is normally placed in use by being blown or otherwise deposited in the reactor or converter until the desired bed height is obtained. An anthracene-air mixture containing as low a mole percent anthracene as desired, such as 0.4% or less, or up to 4.8% is then blown or otherwise passed through the catalyst bed at temperatures ranging from about 265° C. to about 400° C. and preferably from about 320° C. to about 370° C. The linear velocity of the flowing gaseous reactants may be varied within wide limits depending upon the size of the reactor and the height of the catalyst bed therein. Linear velocities from 0.7–1.4 feet per second have been employed and found satisfactory. Contact times of from about 4.2 seconds up to as high as 19 seconds have been found operative for bed heights ranging, for example, from 54 inches up to 13 feet.

The converter product emanating from the mass of fluidized catalyst surprisingly contains substantially no unreacted anthracene and may then be washed free of acids, such as maleic or phthalic acids, in hot water having a temperature preferably above 50–60° C. and dried. Such a product has been found to be substantially pure anthraquinone suitable for direct use in dyestuffs production.

The invention will be further illustrated in greater detail by the following specific runs. It should be understood, however, that although these runs may describe in particular detail some of the more specific features of the invention, they are given primarily for purposes of illustration and the invention in its broader aspects is not to be construed as limited thereto.

Run No. 1

A quantity of catalyst prepared by procedures generally set forth in Example 2 and containing 9.4% $V_2O_5$ and an $SO_3/K_2O$ ratio of 1.6 was blown into a ¾" reactor tube until a bed height of about 5 feet was obtained. An anthracene-air mixture containing approximately 2.0 mole percent anthracene (inlet concentration) was passed through the catalyst bed at a temperature of about 350° C. with a linear velocity of about 1 foot per second whereby a contact time of approximately 5 seconds was established. The conversion in mole percent of anthracene (95.3% pure) to anthraquinone ranged up to 68%; to phthalic anhydride as low as 23% and to carbon monoxide and dioxide 9%. Substantially no unreacted anthracene could be detected. The anthraquinone was washed free of acids with a hot water wash and dried at 125° C. The purity of the anthraquinone produced was determined by comparison of its melting point (284.62° C.) with the melting point of pure anthraquinone (284.71° C.). Such values indicated a purity of the anthraquinone produced as 99.9%.

Run Nos. 2 and 2A

The procedures set forth in Run No. 1 were repeated at inlet temperatures of 300° C. and 330° C. and with anthracene-air mixtures containing up to 4.8 mole percent anthracene. The overall data obtained indicated a broad plateau of operating conditions over which good yields of anthraquinone were obtained without the inclusion of any substantial amounts of unreacted anthracene.

Run No. 3

The catalyst prepared in Example 3 was employed in a 1-inch reactor tube of a fixed fluid-bed unit having a fluidized catalyst bed height of about 54 inches. The anthracene-air mixture contained 0.6 mole percent anthracene (inlet concentration) and was passed through the catalyst bed at a temperature of approximately 320° C. and a linear velocity of 1 foot per second with a contact time of 4.5 seconds. The conversion in mole percent of anthracene to anthraquinone was 65%, to phthalic anhydride approximately 24%, and to carbon monoxide and dioxide about 11%. Substantially no unreacted anthracene was present in the converter product. The purity of the anthracene (after hot water washing) was in excess of 99.5%.

Run Nos. 4 and 4A

The conditions set forth in Run No. 3 were repeated with inlet temperatures of 306° C. and 335° C. In the latter case, there was substantially no change in the converter product, whereas, in the former case, the mole percent conversion of the anthracene was 65% anthraquinone, 21% phthalic anhydride and 14% carbon monoxide and dioxide. Substantially no unreacted anthracene could be detected. The yield of anthraquinone per 100 pounds of anthracene (95% pure) feed was 76 pounds in each case.

Run No. 5

The catalyst prepared in Example 3 was employed in a 2-inch reactor tube of a fixed fluid-bed unit having a catalyst bed height of about 80 inches. The inlet concentration, linear velocity and temperature were as described in Run No. 3 with the contact time increased to 6.7 seconds due to the increased height of the catalyst bed. The reactor product comprised over 70% anthraquinone.

Although I have described but a few specific examples and runs of my invention, I consider the case not to be limited thereby nor to the specific substances mentioned therein, but to include various other equivalent compounds of similar constitution as set forth in the claims appended hereto. It is understood that any suitable changes or variations may be made without departing from the spirit or scope of the inventive concept.

What I claim is:

1. In a method for the vapor phase catalytic oxidation of anthracene to anthraquinone, the step of passing a mixture of anthracene vapor and air having from about 0.4 to about 4.8 mole percent anthracene by volume through a mass of fluidized catalyst maintained at a temperature of from about 265° C. to about 400° C., said catalyst being composed of from about 40% to about 80% of a calcined gel of silica impregnated uniformly with from about 20% to about 60% of a potassium sulfate and from about 2% to about 25% of a vanadium oxide, all percentages being based on the calcined weight of the catalyst.

2. A method for the vapor phase catalytic oxidation of anthracene to anthraquinone which comprises passing a mixture of anthracene vapor and air having from about 0.4 to about 4.8 mole percent anthracene by volume through a mass of fluidized catalyst maintained at a temperature of from about 265° C. to about 400° C., said catalyst being composed of from about 40% to about 80% of a calcined gel of silica impregnated uniformly with from about 20% to about 60% of a potassium sulfate and from about 2% to about 25% of a vanadium oxide, all percentages being based on the calcined weight of the catalyst, and treating the product emanating from said catalytic mass with aqueous media to recover substantially pure anthraquinone.

3. In a method for the vapor phase catalytic oxidation of anthracene to anthraquinone, the step of passing a mixture of anthracene vapor and air having from about 0.4 to about 4.8 mole percent anthracene by volume through a mass of fluidized catalyst maintained at a temperature of from about 265° C. to about 400° C., said catalyst being composed of about 40% to 80% by weight of a calcined gel of silica impregnated uniformly with about 20% to 60% of a potassium sulfate, about 2% to 25% of a vanadium oxide and from 0.05% to about 5% of an oxide of metal selected from the group consisting of silver, iron, zirconium, molybdenum and cerium, all percentages being based on the calcined weight of the catalyst, whereby an anthraquinone-containing product is obtained which does not contain any unreacted anthracene.

4. A method for the vapor phase catalytic oxidation of anthracene to anthraquinone which comprises passing a mixture of anthracene vapor and air having from about 0.4 to about 4.8 mole percent anthracene by volume through a mass of fluidized catalyst maintained at a temperature of from about 265° C. to about 400° C., said catalyst being composed of about 40% to 80% by weight of a calcined gel of silica impregnated uniformly with about 20% to 60% of a potassium sulfate, about 2% to 25% of a vanadium oxide and from 0.05% to about 5% of an oxide of metal selected from the group consisting of silver, iron, zirconium, molybdenum and cerium, all percentages being based on the calcined weight of the catalyst, and treating the product emanating from said catalytic mass with aqueous media to recover substantially pure anthraquinone.

5. In a method for the vapor phase catalytic oxidation of anthracene to anthraquinone which comprises passing a mixture of anthracene vapor and air having from about 0.4 to about 4.8 mole percent anthracene by volume through a mass of fluidized catalyst maintained at a temperature of from about 320° C. to about 370° C., said catalyst being composed of about 40–50% by weight of a calcined gel of silica impregnated uniformly with about 40–50% of a potassium sulfate, about 2–10% of vanadium pentoxide and about 0.2–2% of an oxide of a metal selected from the group consisting of silver, iron, zirconium, molybdenum and cerium, all percentages being based on the calcined weight of the catalyst.

6. A method for the vapor phase catalytic oxidation of anthracene to anthraquinone which comprises passing a mixture of anthracene vapor and air having from about 0.4 to about 4.8 mole percent anthracene by volume through a mass of fluidized catalyst maintained at a temperature of from about 320° C. to about 370° C., said catalyst being composed of about 40–50% by weight of a calcined gel of silica impregnated uniformly with about 40–50% of a potassium sulfate, about 2–10% of vanadium pentoxide and about 0.2–2% of an oxide of a metal selected from the group consisting of silver, iron, zirconium, molybdenum and cerium, all percentages being based on the calcined weight of the catalyst, whereby an anthraquinone-containing product is obtained which does not contain any unreacted anthracene, and treating said product with aqueous media to recover substantially pure anthraquinone.

7. In a method for the vapor phase catalytic oxidation of anthracene to anthraquinone, the step of passing a mixture of anthracene vapor and air having from about 0.4 to about 4.8 mole percent anthracene by volume through a mass of fluidized catalyst maintained at a temperature of from about 265° C. to about 400° C., said catalyst being composed of from about 40% to about 50% of a calcined gel of silica impregnated uniformly with from about 40% to about 50% of a potassium sulfate and from about 2% to about 10% of a vanadium oxide, all percentages being based on the calcined weight of the catalyst.

8. A method for the vapor phase catalytic oxidation of anthracene to anthraquinone which comprises passing a mixture of anthracene vapor and air having from about 0.4 to about 4.8 mole percent anthracene by volume through a mass of fluidized catalyst maintained at a temperature of from about 265° C. to about 400° C., said catalyst being composed of from about 40% to about 50% of a calcined gel of silica impregnated uniformly with from about 40% to about 50% of a potassium sulfate and from about 2% to about 10% of a vanadium oxide, all percentages being based on the calcined weight of the catalyst, and treating the product emanating from said catalytic mass with aqueous media to recover substantially pure anthraquinone.

References Cited in the file of this patent
UNITED STATES PATENTS

| | | |
|---|---|---|
| Re. 16,824 | Canon et al. | Dec. 20, 1927 |
| 1,694,122 | Jaeger | Dec. 4, 1928 |
| 1,886,023 | Jaeger | Nov. 1, 1932 |
| 2,027,316 | Johnson | Jan. 7, 1936 |
| 2,471,853 | Beach et al. | May 31, 1949 |
| 2,698,330 | Fugate et al. | Dec. 28, 1954 |